(12) United States Patent
Uehara et al.

(10) Patent No.: US 10,657,993 B1
(45) Date of Patent: May 19, 2020

(54) DISK DEVICE WITH DUAL ACTUATOR CONFIGURATION

(71) Applicants: Kabushiki Kaisha Toshiba, Minato-ku, Tokyo (JP); Toshiba Electronic Devices & Storage Corporation, Minato-ku, Tokyo (JP)

(72) Inventors: Manabu Uehara, Kawasaki Kanagawa (JP); Yasutaka Sasaki, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/535,248

(22) Filed: Aug. 8, 2019

(30) Foreign Application Priority Data

Mar. 15, 2019 (JP) .................................. 2019-048724

(51) Int. Cl.
| | | |
|---|---|---|
| G11B 5/48 | (2006.01) | |
| G11B 5/54 | (2006.01) | |
| G11B 5/012 | (2006.01) | |
| G11B 25/04 | (2006.01) | |
| G11B 7/00 | (2006.01) | |

(52) U.S. Cl.
CPC ............ G11B 5/4813 (2013.01); G11B 5/012 (2013.01); G11B 5/54 (2013.01); G11B 25/043 (2013.01); *G11B 2007/0013* (2013.01)

(58) Field of Classification Search
CPC ....... G11B 5/4813; G11B 5/54; G11B 25/043; G11B 5/012; G11B 2007/0013
See application file for complete search history.

(56) References Cited

U.S. PATENT DOCUMENTS

| | | | | |
|---|---|---|---|---|
| 5,296,984 A | * | 3/1994 | Fick ..................... | G11B 5/4813 360/244.5 |
| 5,644,448 A | * | 7/1997 | Suzuki .................. | G11B 5/486 360/264.2 |
| 5,717,541 A | * | 2/1998 | Ycas ...................... | G11B 21/02 360/264.2 |
| 5,909,342 A | * | 6/1999 | Forbord ............. | G11B 5/59605 360/264.2 |
| 5,991,123 A | * | 11/1999 | Casey .................. | G11B 5/4833 360/264.2 |
| 6,018,439 A | * | 1/2000 | Forbord ............... | G11B 5/4833 360/264.2 |
| 6,108,174 A | * | 8/2000 | Adams ................. | G11B 5/6005 360/266.1 |
| 6,115,215 A | * | 9/2000 | Adams ................... | G11B 5/553 360/264.4 |
| 6,236,531 B1 | * | 5/2001 | Allsup ................. | G11B 5/4846 360/264.2 |

(Continued)

*Primary Examiner* — Brian E Miller
(74) *Attorney, Agent, or Firm* — White & Case LLP

(57) ABSTRACT

According to one embodiment, a disk device comprises a plurality of rotatable magnetic disks, a first actuator assembly, and a second actuator assembly. A slit provided in each of arms of the first actuator assembly is provided to be offset in a direction spaced away from a border plane between actuator assemblies with respect to a center of the arm in its thickness direction. A connection end portion of a wiring member is partially located in the slit, such as to be offset in a direction spaced away from the border plane, and disposed on a wiring board, and joined to the wiring board.

8 Claims, 10 Drawing Sheets

(56) References Cited

U.S. PATENT DOCUMENTS

| | | | |
|---|---|---|---|
| 6,560,075 B2* | 5/2003 | Price | G11B 5/4813 360/246.7 |
| 6,603,640 B1* | 8/2003 | Prater | F16C 19/54 360/264.4 |
| 7,649,717 B2* | 1/2010 | Hayakawa | G11B 5/5526 360/264.2 |
| 7,957,101 B2* | 6/2011 | Matsui | G11B 5/486 29/603.03 |
| 8,068,314 B1* | 11/2011 | Pan | G11B 5/5569 360/245.9 |
| 10,304,483 B1* | 5/2019 | Unger | G11B 5/4826 |
| 2002/0039260 A1* | 4/2002 | Kilmer | G11B 5/5521 360/264.7 |
| 2002/0060885 A1* | 5/2002 | Money | G11B 5/5521 360/264.4 |
| 2005/0152071 A1* | 7/2005 | Hayakawa | G11B 5/5526 360/266.3 |
| 2006/0114614 A1 | 6/2006 | Tsujino et al. | |
| 2006/0291102 A1 | 12/2006 | Honda | |
| 2007/0146935 A1* | 6/2007 | Minami | G11B 5/4833 360/245.9 |
| 2010/0067150 A1* | 3/2010 | Kavosh | G11B 5/4806 360/264.2 |
| 2011/0109996 A1 | 5/2011 | Nakamura et al. | |

\* cited by examiner

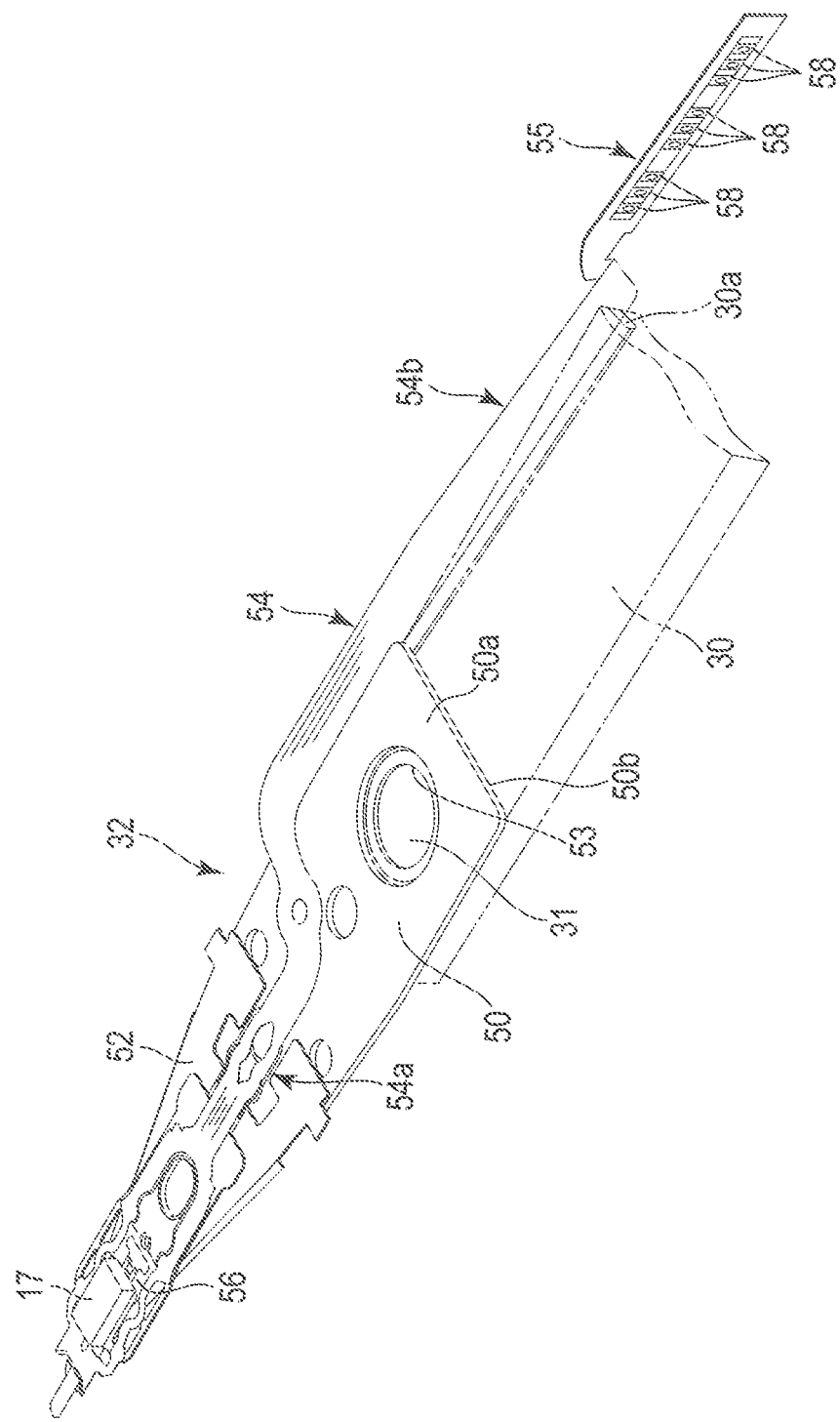
F I G. 4

DISK DEVICE WITH DUAL ACTUATOR CONFIGURATION

CROSS-REFERENCE TO RELATED APPLICATIONS

This application is based upon and claims the benefit of priority from Japanese Patent Application No. 2019-048724, filed Mar. 15, 2019, the entire contents of which are incorporated herein by reference.

FIELD

Embodiments described herein relate generally to a disk device.

BACKGROUND

As a disk device, for example, a hard disk drive (HDD) comprises a magnetic disk, a spindle motor which supports and rotates the magnetic disk, a head actuator which supports a magnetic head, a voice coil motor which drives the head actuator, a flexible printed circuit board unit and the like, which are installed in a housing.

The head actuator includes an actuator block which is rotatably supported around a support shaft, a plurality of arms each extending from the actuator block, and head suspension assemblies(, which may also be referred to as head gimbal assemblies (HGA)) connected to extending ends of the arms, respectively. The head suspension assemblies each comprise a suspension including a base plate and a load beam, a flexure (a wiring member) attached on the suspension, and a magnetic head mounted on a gimbal portion of the flexure. A slit or a slot is formed in a side surface of each arm, and the flexure is formed to extend to the actuator block while at least a part thereof is accommodated in the slit or slot in the arm. The flexure has a connection end portion formed in its extending end, and the connection end portion is electrically joined to the flexible wiring circuit (FPC) board attached to the actuator block.

In recent years, as the storage capacity of HDDs is increased, the number of magnetic disks to be installed is also increasing. In order to meet the demand of an increased number of magnetic disks, the so-called split actuator has been proposed, in which the head actuator is split into a plurality of, for example, two independently rotatable head actuators, which are further stacked one another. The actuator block of one of the head actuators is supported pivotably around the support shaft. The actuator block of the other head actuator is supported pivotably around the support shaft, and is disposed to overlay in the axial direction of the actuator block of the former actuator block.

In such a split actuator as described above, the two head actuators are pivoted independent from each other. With this structure, in order to secure smooth operation of the actuators without interfering with each other, it is necessary to provide a gap (interval) in a boundary between two actuator blocks. As the head actuator is split, the wiring board is also split into two, which are individually attached to the actuator blocks, respectively. When the positioning of attaching wiring boards individually to actuator blocks varies, the two wiring boards may interfere in the boundary portion. In order to prevent this, it is necessary to reduce the area of the wiring board itself. However, if the area of a wiring board is reduced, it becomes difficult to locate the connection pads at appropriate suitable positions to which the connection end portion of the flexure is joined.

BRIEF DESCRIPTION OF THE DRAWINGS

FIG. 4 is a perspective view showing a head suspension assembly of the actuator assembly.

DETAILED DESCRIPTION

Figure 1:
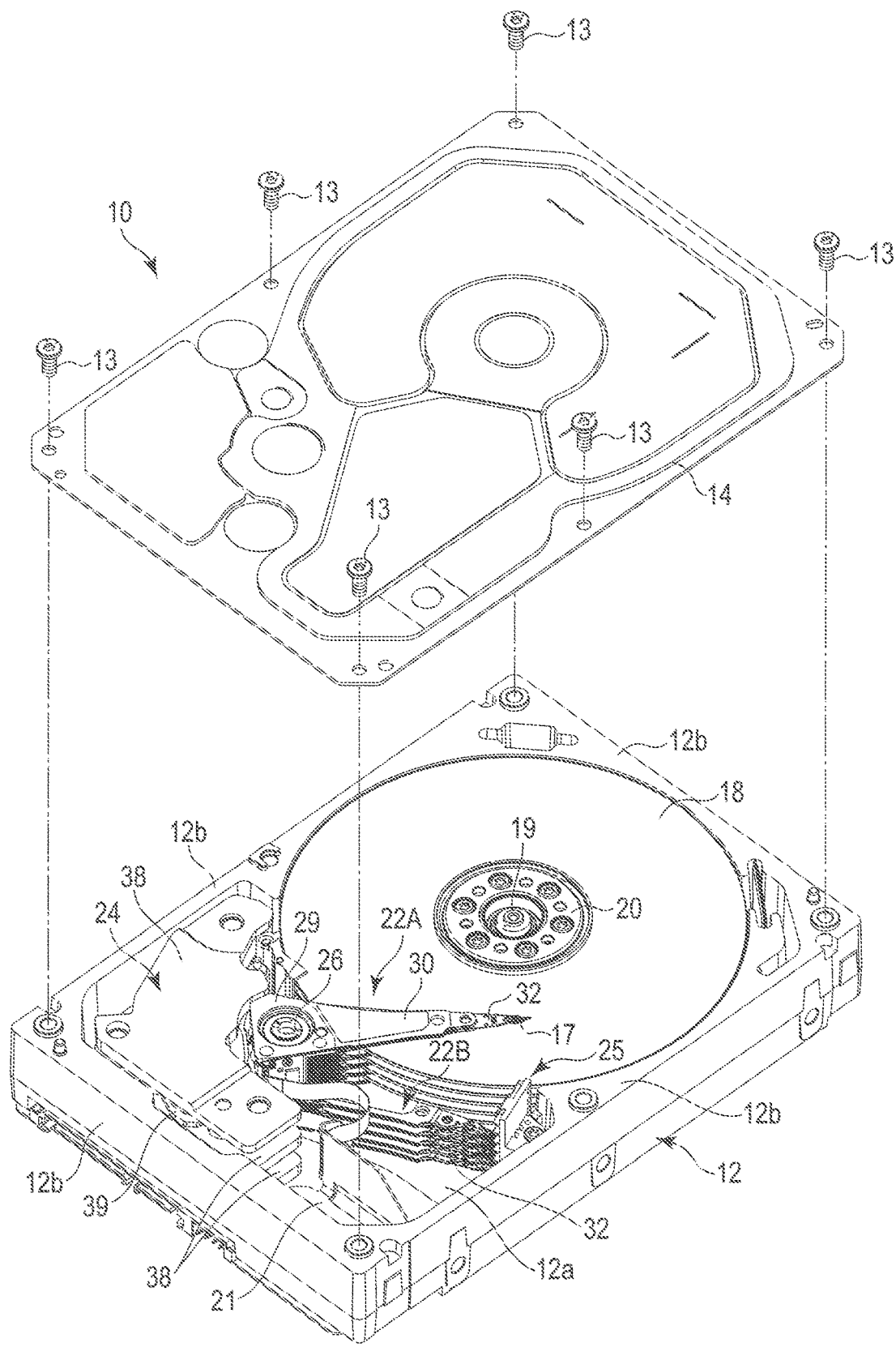
FIG. 1 is a perspective view showing a hard disk drive (HDD) according to the first embodiment, with a top cover thereof is removed.

Various embodiments will be described hereinafter with reference to the accompanying drawings. In general, according to one embodiment, a disk device comprises a plurality of disk-shaped recording media provided to be rotatable, a first actuator assembly comprising a first actuator block supported pivotably around a support shaft, a plurality of arms each extending from the first actuator block and comprising a first surface substantially parallel to a respective one of the plurality of recording media, a second surface opposing the first surface, a side surface intersecting the first surface and the second surface, and a slit provided at the side surface, a plurality of head suspension assemblies each comprising a support plate fixed to an extending end of each of the plurality of arms, a wiring member attached to the support plate and a head supported by the wiring member and a first wiring board comprising a plurality of connection terminals and provided on a setting surface of the first actuator block; and a second actuator assembly comprising a second actuator block supported pivotably around the support shaft and opposing the first actuator block with a gap therebetween, a plurality of arms each extending from the second actuator block and comprising a first surface substantially parallel to a respective one of the plurality of recording media, a second surface opposing the first surface, a side surface intersecting the first surface and the second surface, and a slit provided at the side surface, a plurality of head suspension assemblies each comprising a support plate fixed to an extending end of each of the plurality of arms, a wiring member attached to the support plate and a head supported by the wiring member, and a second wiring board comprising a plurality of connection terminals and provided on a setting surface of the second actuator block. Each of the wiring members of the first actuator assembly comprises a distal end-side portion disposed on the support plate, a rear end-side portion disposed in the slit of the respective one of the arms and extending to the first actuator block, and a connection end portion comprising a plurality of connection terminals and extending from the rear end-side portion, and, of the plurality of connection end portions, at least those adjacent to a border plane between the first actuator block and the second actuator block are provided to be offset in a direction spaced away from the border plane with respect to a central line of the respective one of the arms in its thickness direction. Each of the wiring members of the second actuator assembly comprises a distal end-side portion disposed on the support plate, a rear end-side portion disposed in the slit of the respective one of the arms and extending to the second actuator block, and a connection end portion comprising a plurality of connection terminals and extending from the rear end-side portion, and, of the plurality of connection end portions, at least those adjacent to the border plane are provided to be offset in a direction spaced away from the border plane with respect to a central line of the respective one of the arms in its thickness direction.

What is disclosed in this specification is merely an example. Appropriate modified examples which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

First Embodiment

As a disk device, a hard disk drive (HDD) according to the first embodiment will be described to in detail.

FIG. 1 is an exploded perspective view of the HDD according to the first embodiment, with a top cover detached therefrom. The HDD comprises a flat and substantially rectangular housing 10. The housing 10 comprises a rectangular box-shaped base 12 with an upper surface opened, and a top cover 14. The top cover 14 is secured to the base 12 with a plurality of screws 13 and closes the upper end opening of the base 12. The base 12 comprises a rectangular bottom wall 12a which opposes the top cover 14 with a gap therebetween, and sidewalls 12b provided to stand along peripheral edges of the bottom wall, which are formed, for example, of aluminum integrally as one body. The top cover 14 is formed, for example, of stainless steel into a shape of a rectangular plate. The top cover 14 is screwed on the sidewalls 12b of the base 12, so as to close the upper opening of the base 12.

The housing 10 accommodates a plurality of, for example, nine magnetic disks 18 as recording media and a spindle motor 19, as a drive unit, which supports and rotates the magnetic disks 18. The spindle motor 19 is disposed on the bottom wall 12a. Each of the magnetic disks 18 is formed, for example, to have a diameter of 96 mm, and comprises a magnetic recording layer in an upper surface and/or lower surface thereof. The magnetic disks 18 are fit with a hub (not shown) of the spindle motor 19, such as to be coaxial with each other, and clamped by a clamp spring 20, thereby fixed to the hub. For example, nine 0.635 mm-thick magnetic disks 18 are arranged parallel to each other in a stacking manner with predetermined respective gaps therebetween (for example, 1.58 mm). Further, the magnetic disks 18 are supported parallel to the bottom wall 12a of the base 12. The magnetic disks 18 are rotated at a predetermined number of revolutions by the spindle motor 19.

Note that the number of magnetic disks is not limited to nine, but may be increased or decreased.

The housing 10 accommodates a plurality of magnetic heads 17, which record and reproduce information on and from the magnetic disks 18, and a head actuator assembly 22, which supports the magnetic heads 17 such as to be movable with respect to the respective magnetic disks 18. In the embodiment, the head actuator assembly consists of a split actuator assembly divided into a plurality of actuator assemblies, for example, a first actuator assembly 22A and a second actuator assembly 22B. The first and second actuator assemblies 22A and 22B are supported pivotably around a common support shaft (axis) 26.

The housing 10 accommodates a voice coil motor (hereinafter referred to as VCM) 24 which rotates and positions the first and second actuator assemblies 22A and 22B, a ramped loading mechanism 25 which holds the magnetic heads 17 at respective unloading positions spaced away from the respective magnetic disks 18 when the magnetic heads 32 are moved to the outermost circumferences of the respective magnetic disks 18, and a board unit (FPC) 21 on which electronic components such as conversion connectors are mounted.

A printed circuit board (not shown) is fixed by screws to an outer surface of the bottom wall 12a of the base 12. The printed circuit board constitutes a control unit, which controls the operation of the spindle motor 19 and also controls the operation of the VCM 24 and the magnetic heads 17 via the board unit 21.

Figure 2:
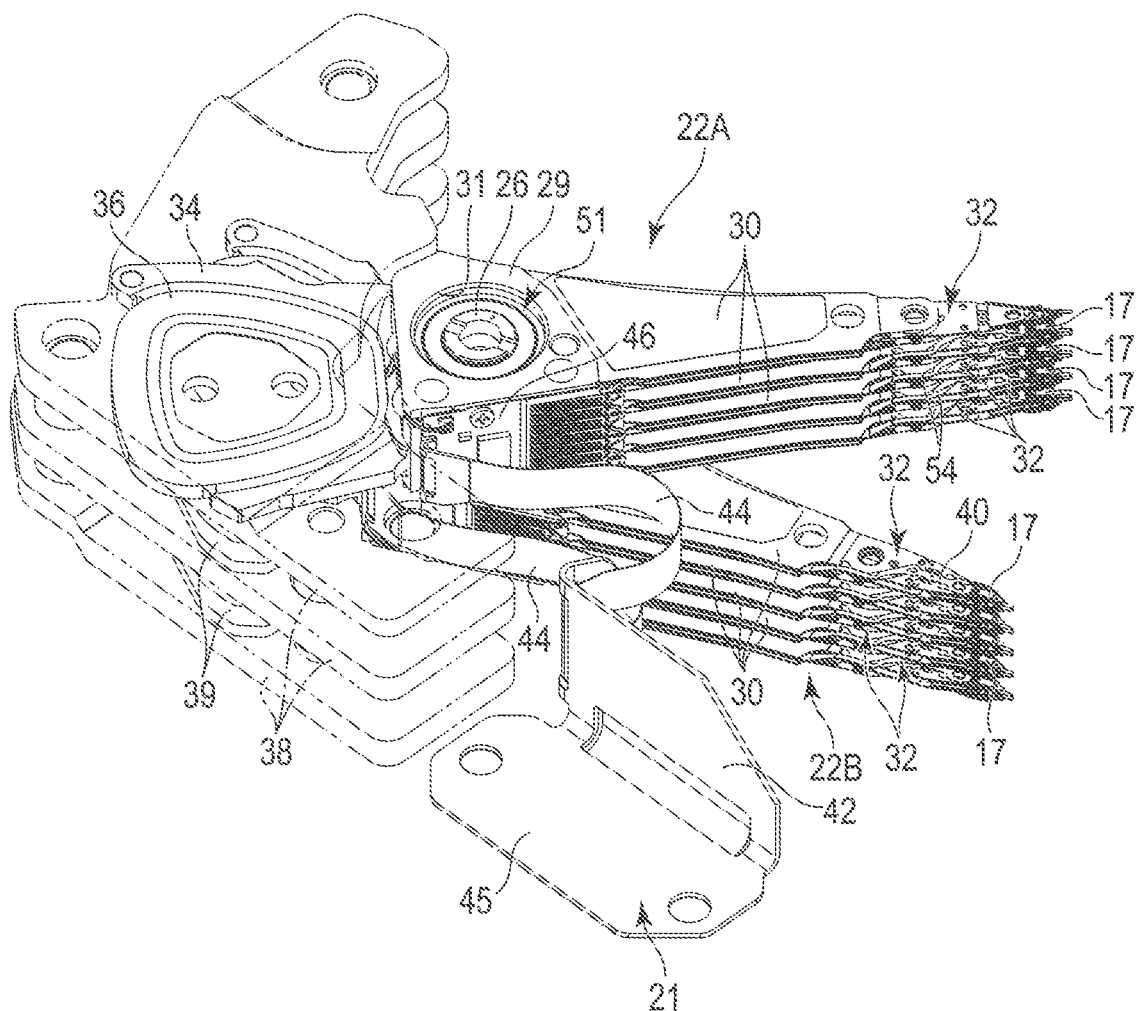
FIG. 2 is a perspective view showing actuator assemblies and a board unit of the HDD.
Figure 3:
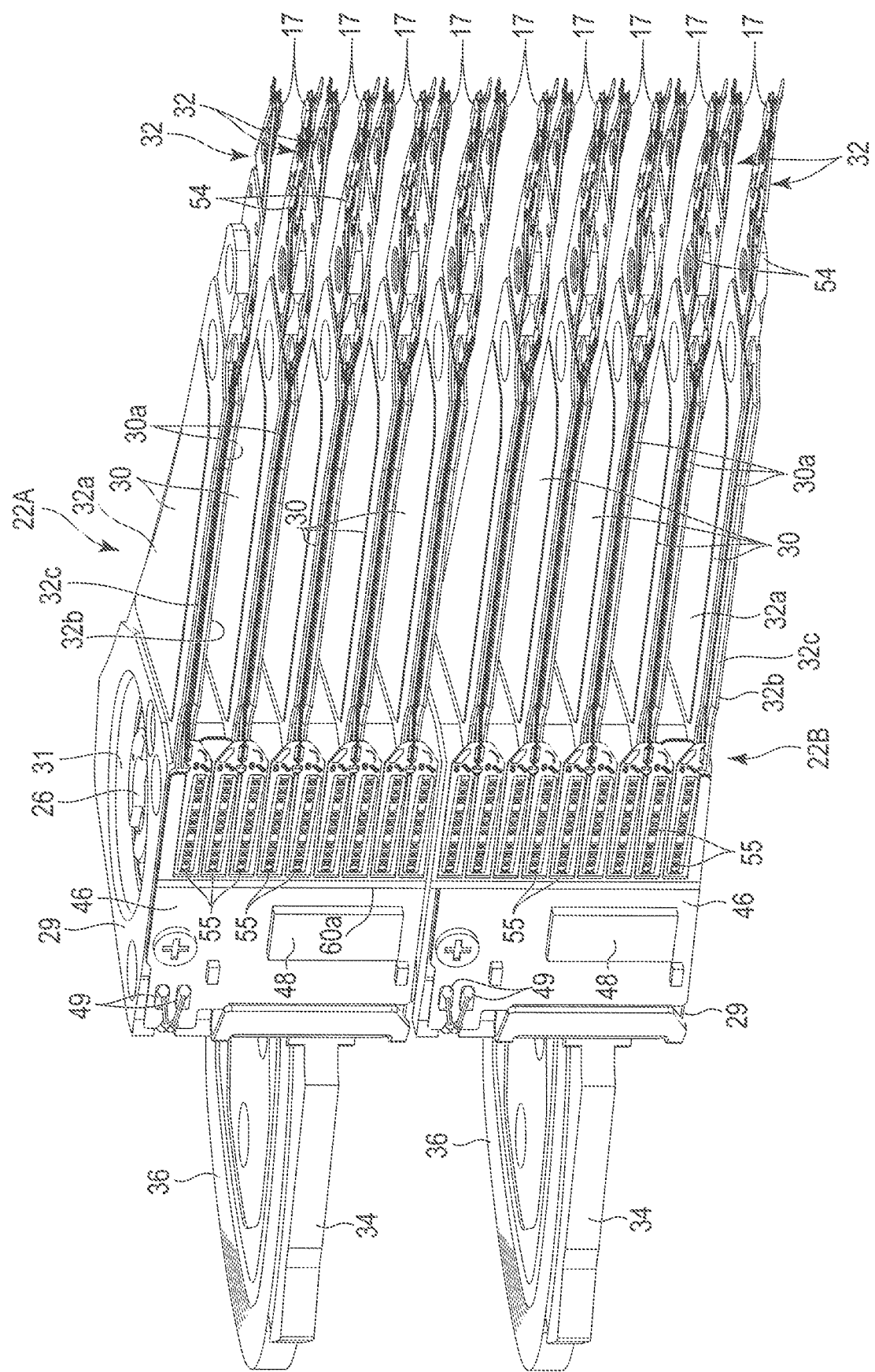
FIG. 3 is a perspective view of the actuator assemblies in an aligned state.

FIG. 2 is a perspective view showing a head actuator assembly including a split actuator assembly and an FPC unit, and FIG. 3 is a perspective view of the split actuator assembly in an aligned state.

As shown in FIGS. 2 and 3, the split actuator assembly includes a first actuator assembly 22A and a second actuator assembly 22B. The first and the second actuator assemblies 22A and 22B are arranged one on top of the other, and also such as to be independently pivotable around the common support shaft 26 provided to stand on the bottom wall 12a of the base 12. The first actuator assembly 22A and the second actuator assembly 22B are configured to have substantially the identical structure. For example, the actuator assembly arranged in an upper side is assigned as the first actuator assembly 22A, and the one in a lower side is assigned as the second actuator assembly 22B.

The first actuator assembly 22A comprises an actuator block (first actuator block) 29, five arms 30 extending from the actuator block 29, head suspension assemblies(, which may be also referred to as head gimbal assemblies (HGA)) 32 attached to the respective arms 30, and the magnetic heads 17 supported by the respective head suspension assemblies. The actuator block 29 comprises an inner hole 31, in which a bearing unit (unit bearing) 51 is accommodated. The actuator block 29 is supported rotatable around the support shaft 26 by the bearing unit 51.

In this embodiment, the actuator block 29 and the five arms 30 are formed, for example, of aluminum or the like, integrally as one body, to constitute the so-called E block. The arms 30 are each formed, for example, into a long and slender plate shape, to extend from the actuator block 29 in a direction orthogonal to the support shaft 26. The arms 30 have a thickness T of about 0.85 mm. The arms 30 each comprises an upper surface (first main surface) 32*a* and a lower surface (second main surface) 32*b* that opposes parallel to the upper surface, a side surface 32*c* located on a magnetic disk side and intersecting the upper surface 32*a* and the lower surface 32*b*, and a slit (slot or groove) 30*a* formed in the side surface 32*c*. The slit 30*a* extends from the actuator block 29 to the extending end of the arm 30 such as to be substantially parallel to the first main surface 32*a* and the second main surface 32*b*. In the slit 30*a*, a part of a flexure (wiring member), which will be described later, is stored and disposed.

The first actuator assembly 22A comprises a support frame 34 extending from the actuator block 29 in a direction opposite to the arms 30. The voice coil 36 is supported by the support frame 34. As shown in FIGS. 1 and 2, the voice coil 36 is located between a pair of yokes 38 provided in the base 12, and constitutes a VCM 24 together with these yokes 38 and a magnet 39 fixed to one of these yokes 38.

As shown in FIGS. 2 and 3, the first actuator assembly 22A comprises nine head suspension assemblies 32, and these head suspension assemblies 32 are attached to the extending ends of the respective arms 30. The head suspension assemblies 32 includes a head-up suspension assembly which supports the respective magnetic head 17 upward, and a head-down suspension assembly which supports the respective magnetic head 17 downward. The head-up suspension assembly and head-down suspension assembly can be constituted by changing the disposition of the suspension assemblies 30 of the same structure upward or downward. In the first actuator assembly 22A of this embodiment, the head-down suspension assembly is attached to the uppermost arm 30 and two head suspension assemblies 32 of a head-up suspension assembly and a head-down suspension assembly are attached to each of the other four arms 30.

The nine head suspension assemblies 32 extend from the five arms 30, respectively, such as to be substantially parallel to each other while keeping predetermined gaps therebetween. Except for the lowermost head-down suspension assembly 32, the two magnetic heads 17 supported by the other four pairs of head-down suspension assemblies and head-up suspension assemblies are located to respectively oppose each other while keeping a predetermined gap therebetween. These magnetic heads 17 are each located to face both surfaces of the corresponding magnetic disk 18. Note that the magnetic head 17 of the lowermost head-up suspension assembly 32 is located to oppose the upper surface of the magnetic disk 18 placed between the magnetic head 17 itself and that of the uppermost head-down suspension assembly 32 of the second actuator assembly 22B, which will be described later.

FIG. 4 is a perspective view showing an example of the head suspension assemblies. As shown, the suspension assembly 32 includes a substantially rectangular base plate 50, a load beam 52 of an elongate plate spring, and an elongate belt-shaped flexure (wiring member) 54. The load beam 52 is fixed and overlap by its proximal end portion to an end portion of the base plate 50. The load beam 52 is formed to extend from the base plate 50, and narrow down toward its extending end. The base plate 50 and the load beam 52 are formed of, for example, stainless steel. For example, the base plate 50 has a thickness of about 150 μm, and the load beam 52 has a thickness of about 25 to 30 μm.

The base plate 50 comprises a first surface 50*a* and a second surface 50*b*, which is a fixed surface on an opposite side. The base plate 50 includes, in its proximal end portion, a circular opening, and an annular protrusion 53 positioned around the opening. The protrusion 53 projects from the second surface 50*b* of the base plate 50. The base plate 50 is disposed to overlay on a bearing surface of the distal end portion 30*b* of the arm 30. The base plate 50 is fastened to the distal end portion 30*b* of the arm 30 by fitting the protrusion 53 of the base plate 50 in a caulking hole (not shown) formed in the arm 30, and caulking the protrusion 53.

The load beam 52 comprises a proximal end portion stacked on a distal end portion of the base plate 50, and is fixed to the base plate 50 by welding a plurality of locations of the load beam 52.

The flexure 54 comprises a metal plate (lining layer) such as of stainless steel, an insulating layer formed on the metal plate, a conductive layer formed on the insulating layer and constituting a plurality of wiring lines (a circuit pattern), and a cover layer (a protective layer, an insulating layer) which covers the conductive layer, which form a long and slender belt-shaped stacked layer. The flexure 54 comprises a distal end-side portion 54*a* and a proximal end-side portion 54*b*. The distal end-side portion 54*a* is attached on the load beam 52 and the first surface 52*a* of the base plate 50. The proximal end-side portion 54*b* extends outwards from the side edge of the base plate 50, and further extends to the proximal end portion of the arm 30 along the arm 30.

A part of the distal end-side portion 54*a* constitutes a displaceable gimbal portion (elastic support portion) 56. The gimbal portion 56 is located on the load beam 52. The magnetic head 17 is mounted on the gimbal portion 56. The wiring lines of the flexure 54 are electrically connected to a read element and write element of the magnetic head 17, a heater and other members.

The proximal end-side portion 54*b* of the flexure 54 projects out from the side edge of the base plate 50, and extends to the proximal end of the arm 30, and the actuator block 29 in through the slit 30*a* (see FIG. 3) formed in the side surface 32*c* of the arm 30. The flexure 54 comprises a connection end portion (tail connection terminal portion) 55 at the rear end of the proximal end-side portion 54*b*. The connection end portion 55 is formed into an elongate rectangular shape. The connection end portion 55 is bent at substantially right angles with respect to the proximal end-side portion 54*b*, and is located substantially perpendicular to the arm 30.

In the connection end portion 55, a plurality of, for example, nine connection terminals (connection pads) 58 are provided. The connection terminals 58 are connected to the wiring lines of the flexure 54, respectively. More specifically, the wiring lines of the flexure 54 extend over the flexure 54 substantially in its full length, and one-side ends thereof are electrically connected to the magnetic head 17, and the other-side ends are electrically connected to the connection terminals 58.

As shown in FIGS. 3 and 4, the nine connection end portions 55 are joined to a junction 46 of the flexible printed wiring board (FPC) provided in the setting surface of the actuator block 29. As will be described later, the connection terminals 58 of each connection end portion 55 are joined by solder to the connection terminals provided in the junction 46, and are electrically and mechanically joined to the FPC. The nine connection end portions 55 are arranged in the axial direction of the support shaft 26, so as to adjacent and substantially parallel to each other.

On the other hand, the second actuator assembly 22B is configured to be similar to the first actuator assembly 22A. More specifically, as shown in FIGS. 2, 3 and 4, the second actuator assembly 22B comprises an actuator block (second actuator block) 29 containing a bearing unit 51 built therein, five arms 30 extending from the actuator block 29, nine head suspension assemblies 32 attached to the respective arms 30, magnetic heads 17 mounted on the respective head suspension assemblies, and a support frame 34 which supports the voice coil 36.

The actuator block 29 is supported rotatable by the support shaft 26 via the bearing unit 51. The actuator block (second actuator block) 29 is supported by the proximal end portion (a half portion on the bottom wall 12a side) of the support shaft 26, and is disposed under the first actuator block 29 coaxially therewith. The actuator block (second actuator block) 29 is placed to oppose the first actuator block 29 with a slight gap G therebetween.

In the second actuator assembly 22B, a head-up suspension assembly 32 is attached to the lowermost arm 30, and two head suspension assemblies of a head-up suspension assembly 32 and a head-down suspension assembly 32 are mounted to each of the other four arms 30. The voice coil 36 of the second actuator assembly 22B is located between a pair of yokes 38 provided in the base 12, and constitutes a VCM 24 together with the yokes 38 and a magnet 39 fixed to one of these yokes.

The VCM 24 which drives the first actuator assembly 22A and the VCM 24 which drives the second actuator assembly 22B are provided such as to be independent from each other. With this structure, the first actuator assembly 22A and the second actuator assembly 22B can be driven (pivoted) independent from each other.

As shown in FIG. 2, the FPC unit 21 includes a substantially rectangular base portion 42, two long and slender belt-like relay portions 44 extending from one side edge of the base portion 42, and two junctions (a first wiring board and a second wiring board) 46 each provided continuously to a tip of the relay portion 44, which are integrated as one body. The base portion 42, the relay portion 44, and the junction 46 are each formed from a flexible printed circuit board (FPC). The flexible printed circuit board comprises an insulating layer such as of polyimide, a conductive layer provided on the insulating layer and forming wiring lines, connection pads and the like, and a protective layer which covers the conductive layer.

On the base portion 42, electronic parts such as a conversion connector (not shown) and a plurality of capacitors are mounted, and are electrically connected to wiring lines (not shown). To the base portion 42, a metal plate 45 which functions as a reinforcing board is attached. The base portion 42 is placed on the bottom wall 12a of the base 12. The two relay portions 44 extend from a side edge of the base portion 42 towards the first and second actuator assemblies 22A and 22B. The junction 46 provided in the extending end of each of the relay portion 44 is attached to one side surface (setting surface) of the actuator block 29 via a lining board, which will be described later, and further fixed to the setting surface with fixation screws.

Figure 5:
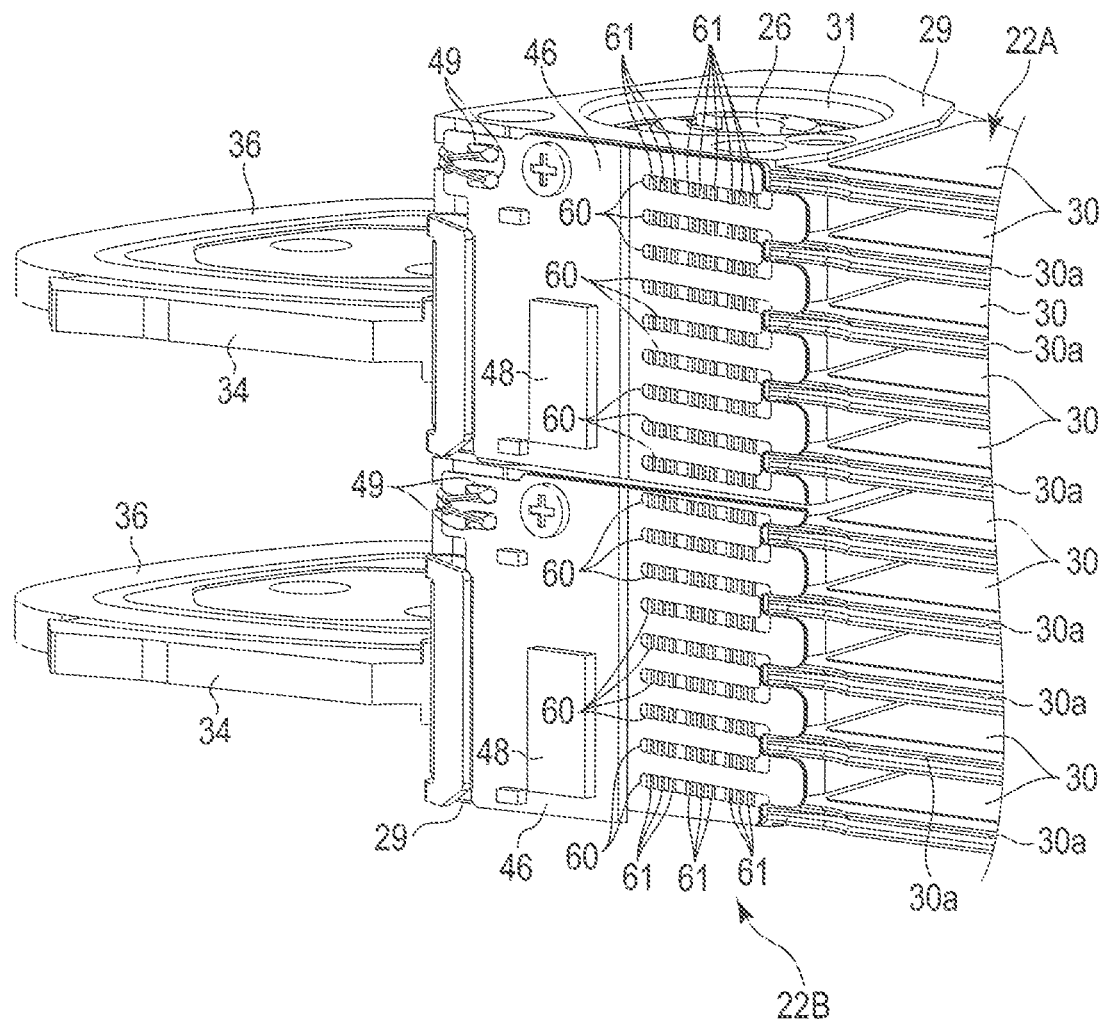
FIG. 5 is a perspective view showing the actuator assemblies mentioned above in a state where the connection end portion of each flexure has not been joined.

FIG. 5 is a perspective view showing the actuator assemblies in the state where the connection end portions of the flexures have not been joined.

As shown, each of the junctions 46 of the FPC unit 21 is formed into a rectangular shape a size of which is slightly smaller than that of the setting surface (side surface) of the actuator block 29. On a rear surface of each junction 46, a lining board made of, for example, aluminum is attached as a reinforcing board. The lining board is formed into substantially the same size and shape as those of the respective junction 46. The junctions 46 are each attached and screwed to the setting surface of the actuator block 29 via the respective lining boards.

The junctions 46 each comprises nine connection pad groups 60, which correspond to the connection end portions 55 of the respective flexures 54. Each of the connection pad groups 60 contains, for example, nine connection pads 61 arranged in one row. The connection pads 61 are each electrically connected to the base portion 42 via the wiring lines of the FPC. The connection pad groups 60 each extend in a direction slightly inclined to a direction substantially orthogonal to the support shaft 26. The nine connection pad groups 60 are arranged in the axial direction of the support shaft 26 while maintaining gaps respectively therebetween. The nine connection pad groups 60 are provided in respective positions adjacent to the proximal ends of the respective arms 30 in the junction 46.

On the junction 46, a head IC (head amplifier) 48 is mounted and the head IC 48 is connected to the connection pads 61 and the base portion 42 via the wiring lines. Further, the junction 46 comprises connection pad 49 to which the voice coil 36 is connected.

As shown in FIG. 3, the connection end portion 55 of each flexure 54 is disposed to overlap the corresponding connection pad group 60 of the respective junction 46, and the nine connection terminals 58 of the connection end portion 55 are joined electrically and mechanically to the corresponding connection pads 61, respectively, by solder.

Thus, the nine magnetic heads 17 of the first actuator assembly 22A are each electrically connected to the base portion 42 via the wiring lines of the respective flexures 54, the connection end portions 55, the junction 46 of the FPC unit 21, and the relay portion 44. Similarly, the nine magnetic heads 17 of the second actuator assembly 22B are each electrically connected to the base portion 42 via the wiring lines of the respective flexures 54, the connection end portions 55, the junction 46 of the FPC unit 21, and the respective relay portion 44. Further, the base portion 42 is electrically connected to the printed circuit board on a bottom surface side of the housing 10 via the conversion connector.

Figure 6:
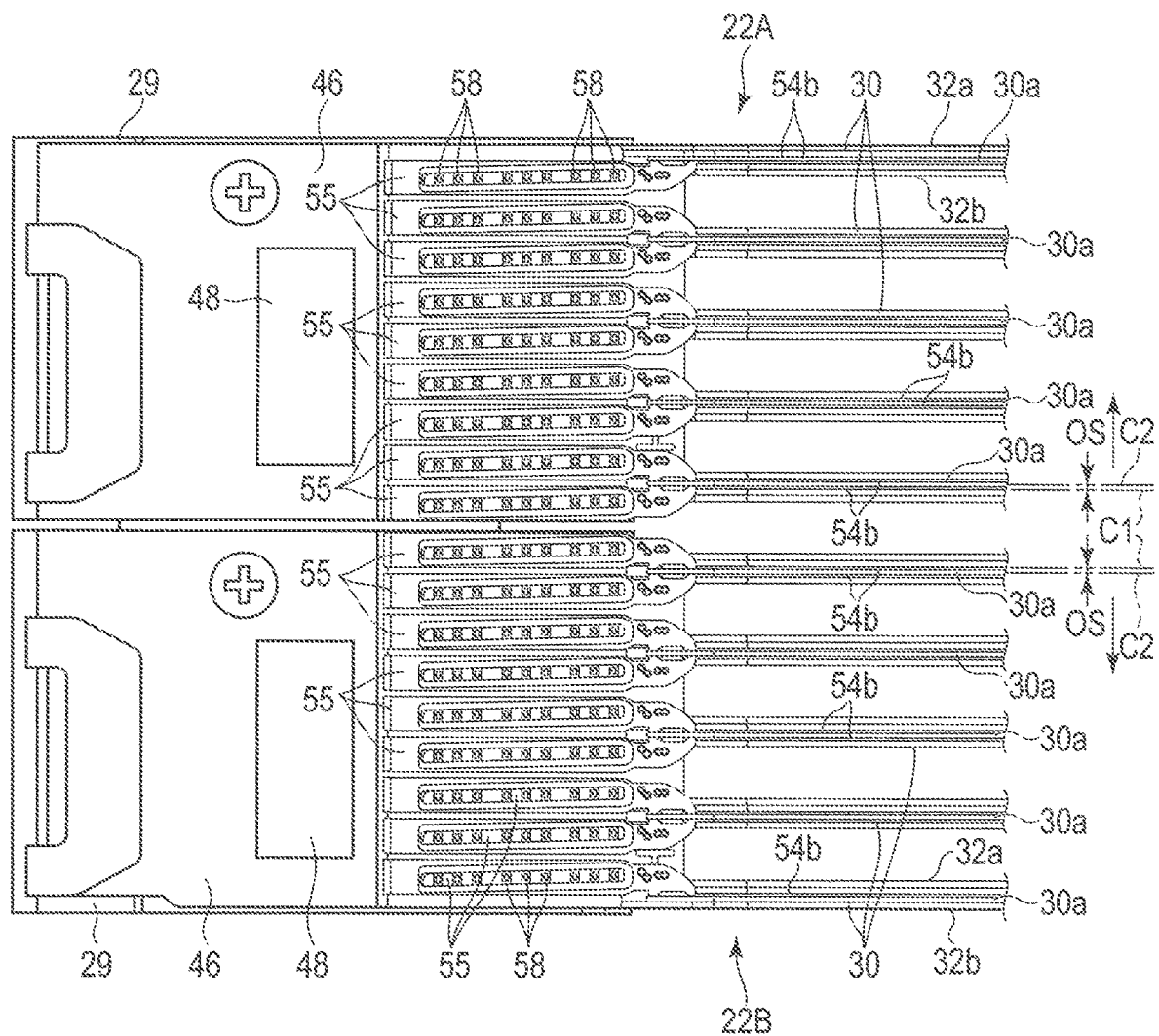
FIG. 6 is a side view showing an actuator block, a connection end portion and an arm of each of the actuator assemblies.

Next, the arrangement of the connection end portions 55 with respect to the junction 46 and the structure of the boundary portion between the actuator blocks will be described in detail. FIG. 6 is a side view showing the junctions of the actuator assemblies and FIG. 7 is a side view partially showing the actuator block in the state where the junctions and flexures of the FPC unit are not attached, and arms.

Figure 7:
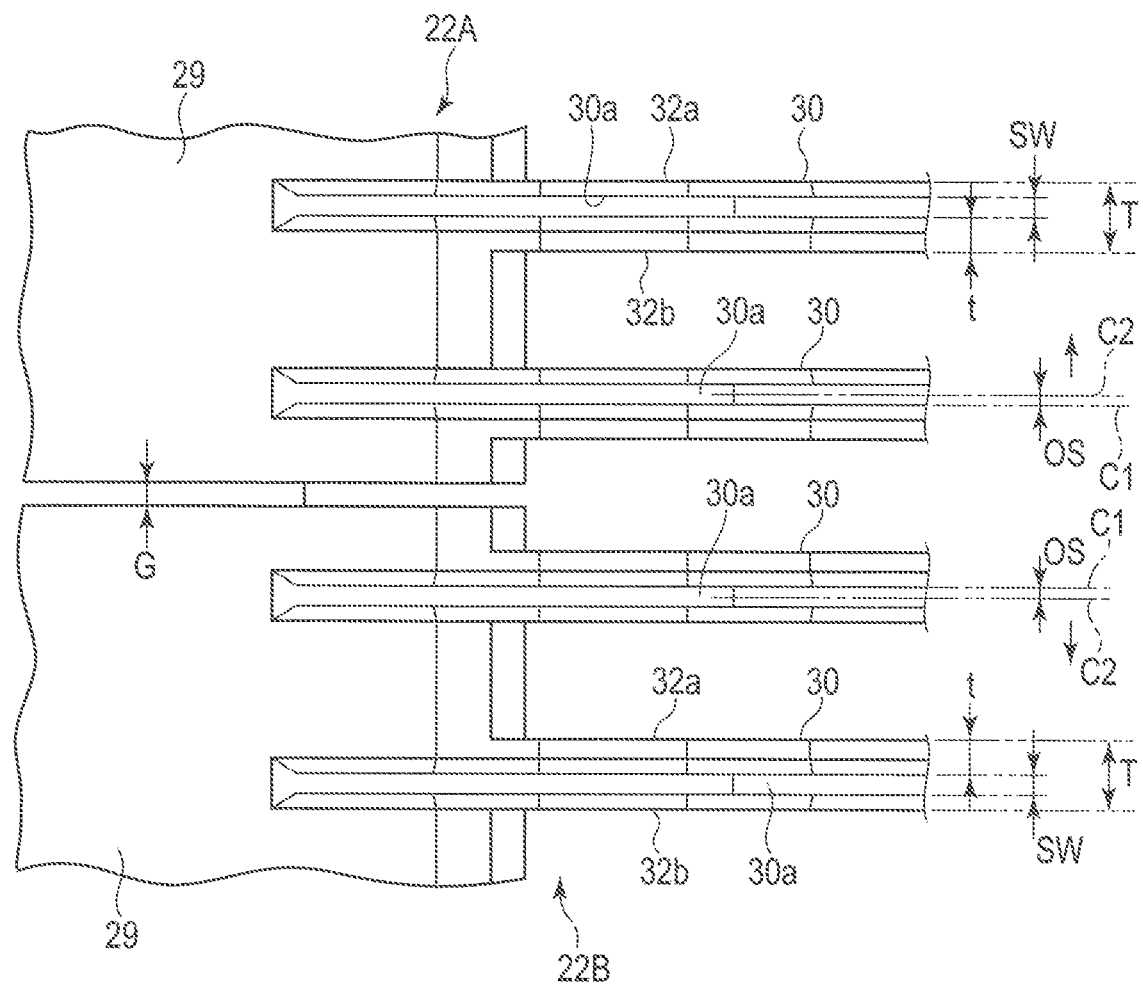
FIG. 7 is an expand side view showing actuator blocks and arms.

As shown in FIG. 7, the arms 30 each comprises a slit 30a formed along the side surface. The slit 30a extends from the proximal end of the arm 30 over to its distal end such as to be substantially parallel to the upper surface 32a and the lower surface 32b. For example, the arms 30 are each formed to have a thickness T of 0.85 mm and the slits 30a are each formed to have a width (the width in the thickness direction of the arm) SW of about 0.25 mm. In this embodiment, the slits 30a are each formed offset by a predetermined amount OS in a direction spaced away from the border plane of the respective head actuator assemblies, with respect to a central line C1 passing through the center of the arm 30 in its thickness direction. That is, a central line C2 passing through the center of the slit 30a in its width direction is located to be offset by an amount OS with respect to the center line C1 of the arm 30 in its thickness direction. The offset amount OS is, for example, 0.1 mm.

In the first head actuator assembly 22A disposed in the upper portion, the slits 30a of the respective arms 30 are each offset in a direction spaced away from the border plane (split plane) between respective adjacent pair of two actuator blocks 29, that is, the up direction in FIG. 7. In the second head actuator assembly 22B disposed in the lower portion, the slits 30a of the respective arms 30 are each offset in a direction spaced away from the border plane, that is, the down direction.

Note that the offset amount OS is not limited to 0.1 mm, but can be adjusted to, for example, 0.05 mm or more but 0.15 mm or less.

As shown in FIG. 6, the proximal end-side portions 54b of the flexures 54 are accommodated in the slits 30a of the respective arms 30, and the connection end portions 55 are disposed to be overlaid on the respective connection pad groups 60 of the junction 46 of the FPC unit, to be joined to the connection pads 61, respectively. Here, since the slits 30a are offset as described above, the proximal end-side portions 54b and the connection end portions 55, as well, are disposed in positions displaced by the offset amount OS in the direction spaced away from the border plane.

With the above-described structure, the gap between the connection end portion 55 disposed near the border plane, i.e., the connection end portion 55 located in the lowermost part of the first actuator assembly 22A, and the connection end portion 55 located in the uppermost part of the second actuator assembly 22B, can be expanded twice the offset amount OS. Moreover, with the arrangement that the connection end portions 55 are disposed at positions offset in the direction spaced away from the border plane, the connection terminals 58 can be displaced immediately above the respective connection pad groups 60 provided in the junction 46 side even in the connection end portion 55 located nearest to the border plane of the actuator block 29. Thus, the connection terminals 58 of each connection end portion 55 can be soldered to the respective connection pads 61 at appropriate positions, thus improving the reliability in junction.

According to the first embodiment constituted as above, the slits of the actuator arms are provided to be offset, and with this structure, a disk device can be obtained, in which the connection end portions of the flexure can be appropriately joined to the wiring board.

Note that, in the first embodiment, the slit offset amounts OS of the two sets of actuator assemblies are set equal to each other, but the embodiment is not limited to this. For example, the slit offset amount may be set different from one actuator assembly to another. Moreover, the offset amount may be changed from one arm to another.

Moreover, the actuator assembly can be split not only into two sets, but three sets or more. For example, when using three sets of actuator assemblies, it suffices if the following structures are taken. That is, in the actuator assembly disposed in the middle, the slits are formed in the centers of the respective arms in their thickness direction of the arm. Then, in the upper arms, the slits are provided to be offset in a direction spaced away from the border plane with the upper actuator assembly, whereas in the lower arms, the slits are provided to be offset in a direction spaced away from the border plane with the lower actuator assembly.

First Modified Example

Figure 8:
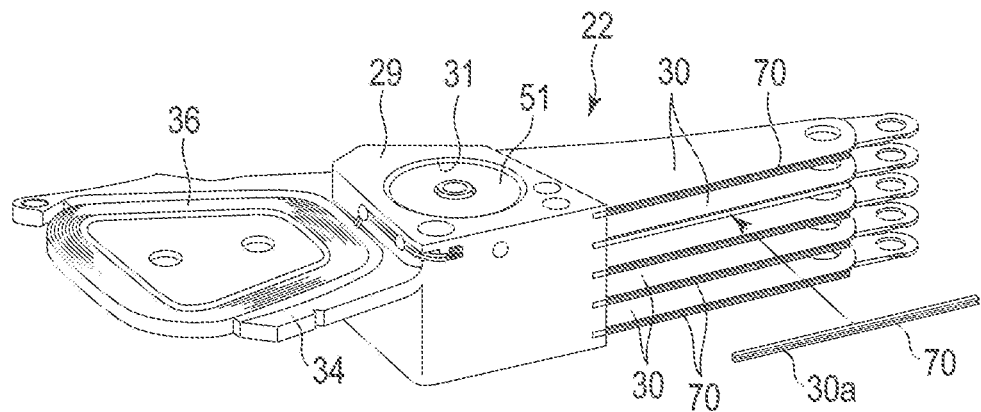
FIG. 8 is a perspective view partially showing actuator assemblies according to the first modified example.
Figure 9:
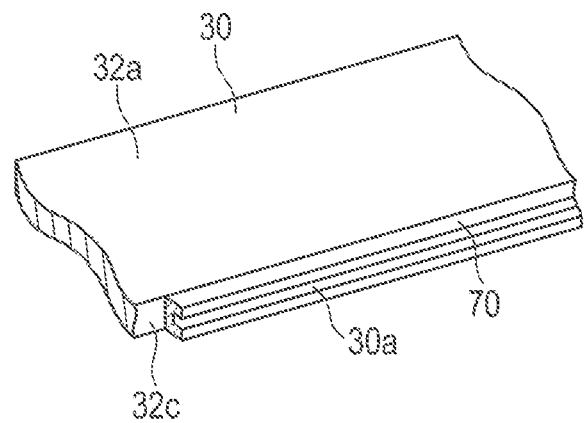
FIG. 9 is a perspective view partially showing an arm according to the first modified example.
Figure 10:
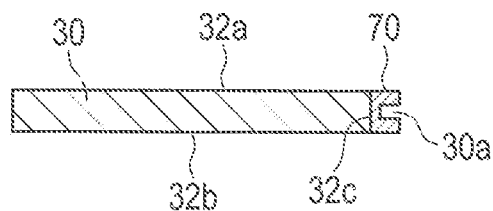
FIG. 10 is a cross section of the arm.

FIG. 8 is a perspective view partially showing an actuator assembly according to the first modified example. FIG. 9 is a partially enlarged perspective view of an arm. FIG. 10 is a cross section of the arm.

In the first embodiment described above, the slits 30a of the arms 30 are directly formed in the side surfaces 32c of the arms 30, but the structure is not limited to this. It is also possible to attach a belt-shaped member in which a slit is formed, to each of the side surfaces 32c of the arms 30.

According to the first modified example, as shown in FIGS. 8 to 10, the actuator assembly 22 comprises a belt-shaped slit-formed member 70 made of, for example, a synthetic resin or metal. The slit-formed member 70 comprises a slit (slot or groove) 30a extending over in its full length in the axial direction. The slit-formed member 70 is attached on the side surface 32c of each arm 30 such as to continuously extend over the side surface 32c in its full length. In this case, the slit-formed member 70 may be formed such as the central line passing through the center of the slit 30a in its width direction is located to be offset in a direction spaced away from the border plane of the actuator assembly with respect to the central line of the arm passing through the center of the arm 30 in its thickness direction.

Second Modified Example

Figure 11:
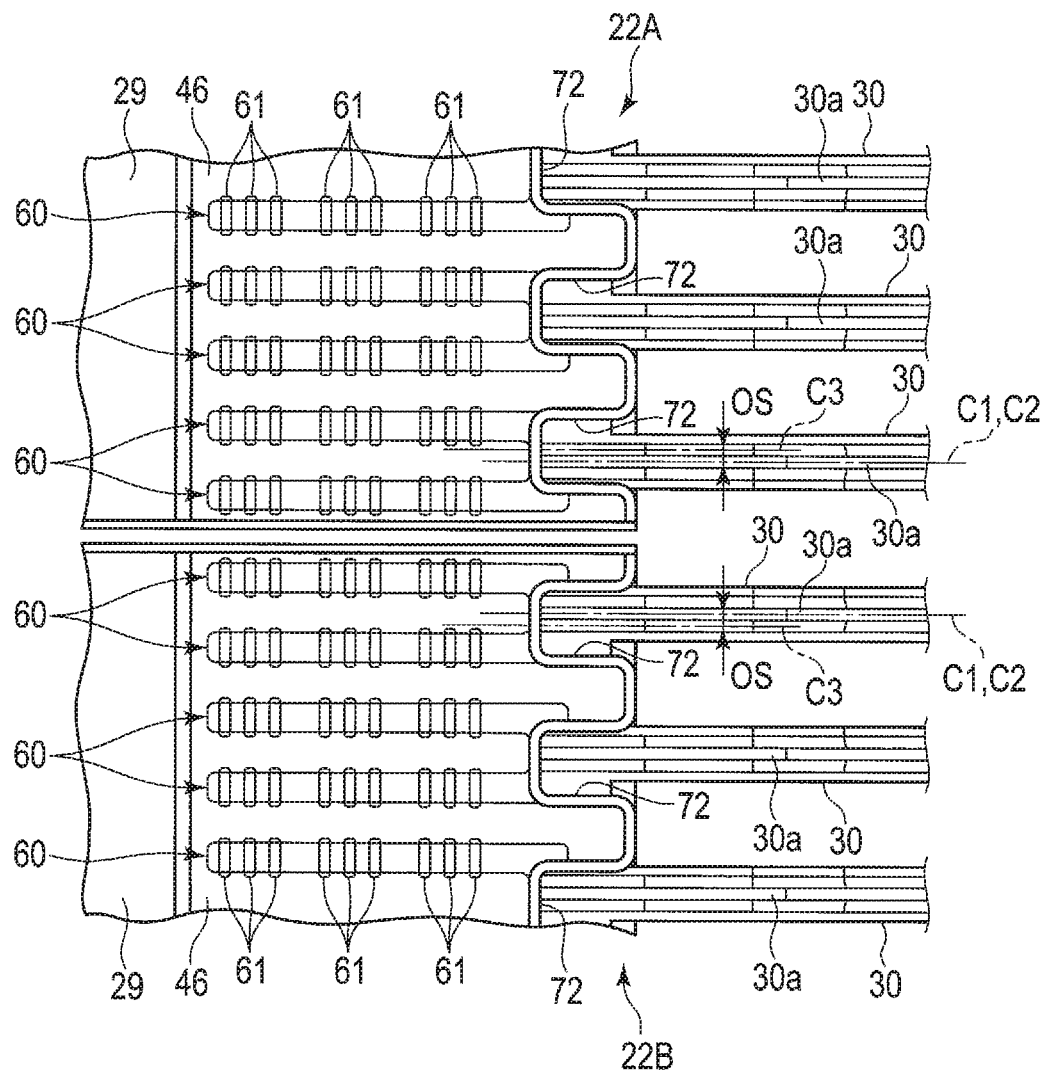
FIG. 11 is a side view partially showing actuator assemblies according to the second modified example.

FIG. 11 is a side view showing actuator blocks of an actuator assembly, arms and wiring boards (a first junction and a second junction) according to the second modified example.

The first embodiment described above has the structure in which the slits 30a of the arms 30 are each formed to be offset with respect to the center of the arm 30 in its thickness direction. In contrast, according to the second modified example, as shown in FIG. 11, the slits 30a of the arms 30 are formed to be aligned with respect to the centers of the respective arms 30 in their thickness direction without being offset. That is, the central line C2 passing through the center of each slit 30a in its width direction coincides with the central line C1 passing through the center of the respective arm 30 in its thickness direction. In place, a notch portion 72 of the junction (wiring board) of the FPC unit fixed to the setting surface of the actuator block 29 is offset with respect to the central line C1 of the respective arm 30.

In detail, the junction (wiring board) 46 fixed to the setting surface of the actuator block 29 comprises a plurality of notch portions 72 formed in side-edge portions each on a side of the respective arm 30. The notch portions 72 are each disposed to overlap the proximal end portion of the respective arm 30, such as to be continuous to the respective slit 30a. Thus, the notch portion 72 constitutes a part of the slit. Moreover, a plurality of connection pad groups 60 of the junction 46 are formed near the notch portions 72, respectively.

According to the second modified example, the junction 46 is disposed in such a position that the central line C3 passing through the center of each notch portion 72 in the width direction is offset by a predetermined amount OS in a direction spaced away from the border plane between the two actuator assemblies 22A and 22B, with respect to the central line C1 of the respective arm 30. The offset amount OS can be adjusted in a range of, for example, 0.05 mm or more but 0.15 mm or less.

The connection end portions 55 of the flexures (not shown) pass the slits 30a of the respective arms 30, and then are disposed on the junction 46 via the respective notch portions 72. With this structure, as the notch portions 72 are offset, the connection end portions 55 are also accordingly offset. Therefore, in the second modified example as well, an advantageous effect similar to that of the first embodiment, in which the slits 30a are offset, can be obtained.

Next, a head suspension assembly of an HDD according to another embodiment will now be described. In the following explanation of the further embodiment, those portions that are the same as those of the first embodiment will be given the same reference numbers and their detailed explanation will be omitted. Only those portions that are different from the first embodiment will be mainly explained in detail.

Second Embodiment

Figure 12:
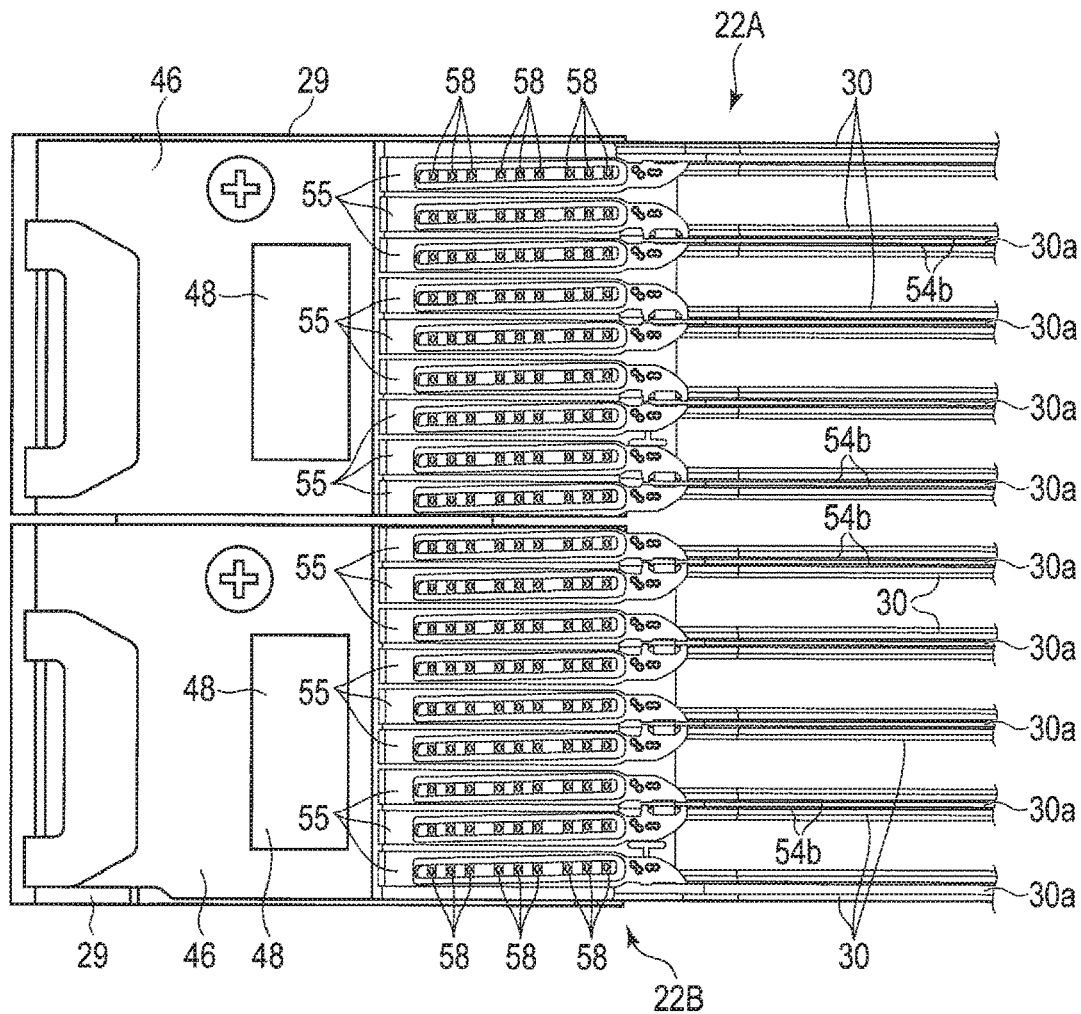
FIG. 12 is a side view of actuator assemblies of an HDD according to the second embodiment.
Figure 13:
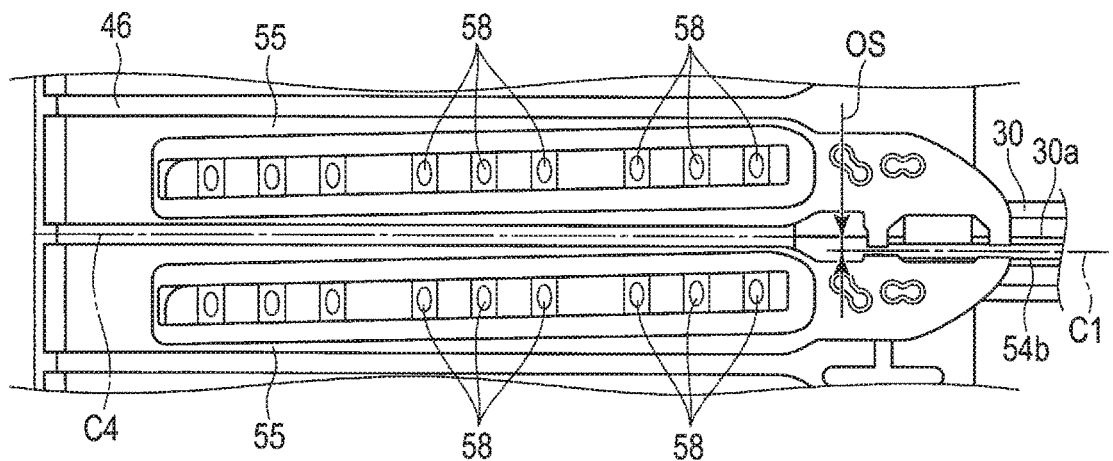
FIG. 13 is an expanded side view showing a connection end portion of a flexure of the HDD according to the second embodiment.

FIG. 12 is a side view showing a junction of the actuator assembly of the HDD according to the second embodiment and FIG. 13 is a partially expanded side view showing the junction.

As shown, according to the second embodiment, the head actuator assembly of the HDD is configured as a split actuator assembly split into a plurality of actuator assemblies, for example, a first actuator assembly 22A and a second actuator assembly 22B. The first and second actuator assemblies 22A and 22B are supported pivotably around a common support shaft (axis) 26.

The basic structures of the first actuator assembly 22A and the second actuator assembly 22B are the same as those of the first actuator assembly and the second actuator assembly in the first embodiment described above.

In the second embodiment, slits 30a formed in the arms 30 of each of the actuator assemblies 22A and 22B are each formed to be aligned in a central line C1 passing through the center of the respective arm 30 in the thickness direction. In other words, they are not offset.

The connection end portions 55 of a plurality of flexures 54 are joined respectively to the connection pad groups of the respective junction (wiring board) 46. During this operation, as shown in FIG. 13, two connection end portions 55 adjacent to each other and extending from one arm 30 in each of the actuator assemblies 22A and 22B, or at least two connection end portions 55 most adjacent to the border plane of the actuator block 29 are disposed in such respective positions that a central line C4 passing through the center between these two connection end portions 55 is offset by a predetermined amount OS in a direction spaced away from the border plane, with respect to the central line C1 passing through the center of the respective arm 30 in its thickness direction. For example, the offset amount OS is set to about 0.1 mm.

According to this embodiment, in each of the actuator assemblies 22A and 22B, nine connection end portions 55 are arranged to be offset by an offset amount OS in the direction spaced away from the border plane.

In the second embodiment, the other structures of the HDD are the same as those of the HDD according to the first embodiment described above.

According to the second embodiment configured as described above, the connection end portions 55, themselves, of the flexures 54 are arranged to be offset in the direction spaced away from the border plane. With this structure, even for the connection end portion 55 located most close to the border plane of the actuator block 29, the connection terminals 58 can be disposed immediately above the respective connection pad groups 60 provided on a junction 46 side. Thus, the connection terminals 58 of the connection end portions 55 can be joined by solder to the respective connection pads at appropriate positions, thus making it possible to improve the reliability of junction. In this manner, a disk device in which the connection end portions of the flexures can be joined appropriately to the respective wiring boards, can be obtained.

Note in the second embodiment, the actuator assembly can be split not only into two sets, but three sets or more. For example, when using three sets of actuator assemblies, it suffices if the following structures are taken. That is, in the actuator assembly disposed in the middle, the two connection end portions located in the axial centers are disposed without being offset with respect to the center of the respective arm. Then, the upper connection end portions are provided to be offset in a direction spaced away from the border plane with respect to the upper actuator assembly, whereas the lower connection ends are provided to be offset in a direction spaced away from the border plane with respect to the lower actuator assembly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

As set out above, the actuator assembly may take such a structure that not only two assemblies, as the first and second assemblies discussed above, but three or more actuator assemblies are pivotally supported on a common support shaft.

The number of magnetic disks is not limited to nine, but may be eight or less, or ten or more, in which case, the numbers of head suspension assemblies and magnetic heads may be decreased or increased according to the number of magnetic disks. In the connection ends of each flexure, the number of connection terminals is not limited to nine, but may be increased or decreased if needed. The materials, shapes, sizes, etc., of elements which constitute the disk device are not limited to those in the above-described embodiments, and can be changed variously as needed.

What is claimed is:

1. A disk device comprising:
 a plurality of disk-shaped recording media provided to be rotatable;
 a first actuator assembly comprising:
   a first actuator block supported pivotably around a support shaft;
   a plurality of arms each extending from the first actuator block and comprising a first surface substantially parallel to a respective one of the plurality of recording media, a second surface opposing the first surface, a side surface intersecting the first surface and the second surface, and a slit located in the side surface;
   a plurality of head suspension assemblies each comprising a support plate fixed to an extending end of each of the plurality of arms, a wiring member attached to the support plate and a head supported by the wiring member; and
   a first wiring board comprising a plurality of connection terminals and provided on a setting surface of the first actuator block; and
 a second actuator assembly comprising:
   a second actuator block supported pivotably around the support shaft and opposing the first actuator block with a gap therebetween;

a plurality of arms each extending from the second actuator block and comprising a first surface substantially parallel to a respective one of the plurality of recording media, a second surface opposing the first surface, a side surface intersecting the first surface and the second surface, and a slit located in the side surface;

a plurality of head suspension assemblies each comprising a support plate fixed to an extending end of each of the plurality of arms, a wiring member attached to the support plate and a head supported by the wiring member; and a second wiring board comprising a plurality of connection terminals and provided on a setting surface of the second actuator block;

each of the wiring members of the first actuator assembly comprising a distal end-side portion disposed on the support plate, a rear end-side portion disposed in the slit of the respective one of the arms and extending to the first actuator block, and a connection end portion comprising a plurality of connection terminals and extending from the rear end-side portion, and, of the plurality of connection end portions, at least those adjacent to a border plane between the first actuator block and the second actuator block being provided to be offset in a direction spaced away from the border plane with respect to a central line of the respective one of the arms in its thickness direction, and each of the wiring members of the second actuator assembly comprising a distal end-side portion disposed on the support plate, a rear end-side portion disposed in the slit of the respective one of the arms and extending to the second actuator block, and a connection end portion comprising a plurality of connection terminals and extending from the rear end-side portion, and, of the plurality of connection end portions, at least those adjacent to the border plane being provided to be offset in a direction spaced away from the border plane with respect to a central line of the respective one of the arms in its thickness direction.

2. The device of claim 1, wherein
the slit of each of the arms is provided in such a position that a central line passing a center of the slit in its width direction is offset in a direction spaced away from the border plane with respect to the central line passing the center of the arm in its thickness direction.

3. The device of claim 1, wherein
the arms each comprises a resin or metal-made belt-shaped member fixed to the side surface, and the slit is formed in the belt-shaped member.

4. The device of claim 1, wherein
the slit is formed in the side surface of each of the arms.

5. The device of claim 1, wherein
two connection end portions which extending from each of the arms and adjacent to each other are provided in such positions that a central line between the two connection end portions are offset in the direction spaced away from the border plane with respect to the central line passing a center of each of the arms in its thickness direction.

6. The device of claim 5, wherein
the slit of each of the arms is provided in such a position that a central line passing a center of the slit in its width direction coincides with a central line passing a center of each of the arms in its thickness direction.

7. The device of claim 1, wherein
the first wiring board comprises a plurality of notch portions each located to oppose the side of the respective one of the arms, and the notch portions are each located in such a position that a central line passing a center of a respective one of the notch portions in its width direction is offset in a direction spaced away from the border plane with respect to the central line passing the center of the respective one of the arms in its thickness direction, and the second wiring board comprises a plurality of notch portions each located to oppose the side of the respective one of the arms, and the notch portions are each located in such a position that a central line passing a center of a respective one of the notch portions in its width direction is offset in a direction spaced away from the border plane with respect to the central line passing the center of the respective one of the arms in its thickness direction.

8. The device of claim 1, wherein
an amount of the offsetting is 0.05 mm or more but 0.15 mm or less.

* * * * *